US009081661B2

(12) United States Patent
Unesaki et al.

(10) Patent No.: US 9,081,661 B2
(45) Date of Patent: Jul. 14, 2015

(54) MEMORY MANAGEMENT DEVICE AND METHOD FOR MANAGING ACCESS TO A NONVOLATILE SEMICONDUCTOR MEMORY

(75) Inventors: Tsutomu Unesaki, Hachioji (JP); Yoshiyuki Endo, Akishima (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 901 days.

(21) Appl. No.: 13/234,197

(22) Filed: Sep. 16, 2011

(65) Prior Publication Data

US 2012/0072698 A1 Mar. 22, 2012

(30) Foreign Application Priority Data

Sep. 17, 2010 (JP) ................................. 2010-209997

(51) Int. Cl.
*G06F 12/10* (2006.01)
*G06F 12/02* (2006.01)

(52) U.S. Cl.
CPC .... *G06F 12/0246* (2013.01); *G06F 2212/7201* (2013.01)

(58) Field of Classification Search
None
See application file for complete search history.

(56) References Cited

U.S. PATENT DOCUMENTS

| 6,516,389 | B1 | 2/2003 | Uchihori |
| 2002/0184430 | A1* | 12/2002 | Ukai et al. ........................ 711/3 |
| 2009/0083478 | A1 | 3/2009 | Kunimatsu et al. |
| 2012/0066443 | A1 | 3/2012 | Li et al. |

FOREIGN PATENT DOCUMENTS

| CN | 101625661 A | 1/2010 |
| CN | 101634967 A | 1/2010 |
| CN | 101727402 A | 6/2010 |
| JP | 2001-142737 A | 5/2001 |
| JP | 2001-188706 A | 7/2001 |

OTHER PUBLICATIONS

Office Action issued on Oct. 24, 2013 in the corresponding Chinese Patent Application No. 201110254701.4 (with English Translation).

* cited by examiner

*Primary Examiner* — Gary Portka
(74) *Attorney, Agent, or Firm* — Oblon, McClelland, Maier & Neustadt, L.L.P.

(57) ABSTRACT

According to one embodiment, a memory management device includes a history management unit, an address translation table, an address management unit, and a data management unit. The history management unit manages an access history for data stored in a nonvolatile semiconductor memory. The address translation table includes a translation table of a logical address and a physical address corresponding to the data. The address management unit specifies, based on the access history, second data to be accessed after access to first data being stored in the nonvolatile semiconductor memory, and registers a second physical address corresponding to the second data in the address translation table in association with a first logical address corresponding to the first data. The data management unit reads out the second data from the nonvolatile semiconductor memory to a buffer.

19 Claims, 11 Drawing Sheets

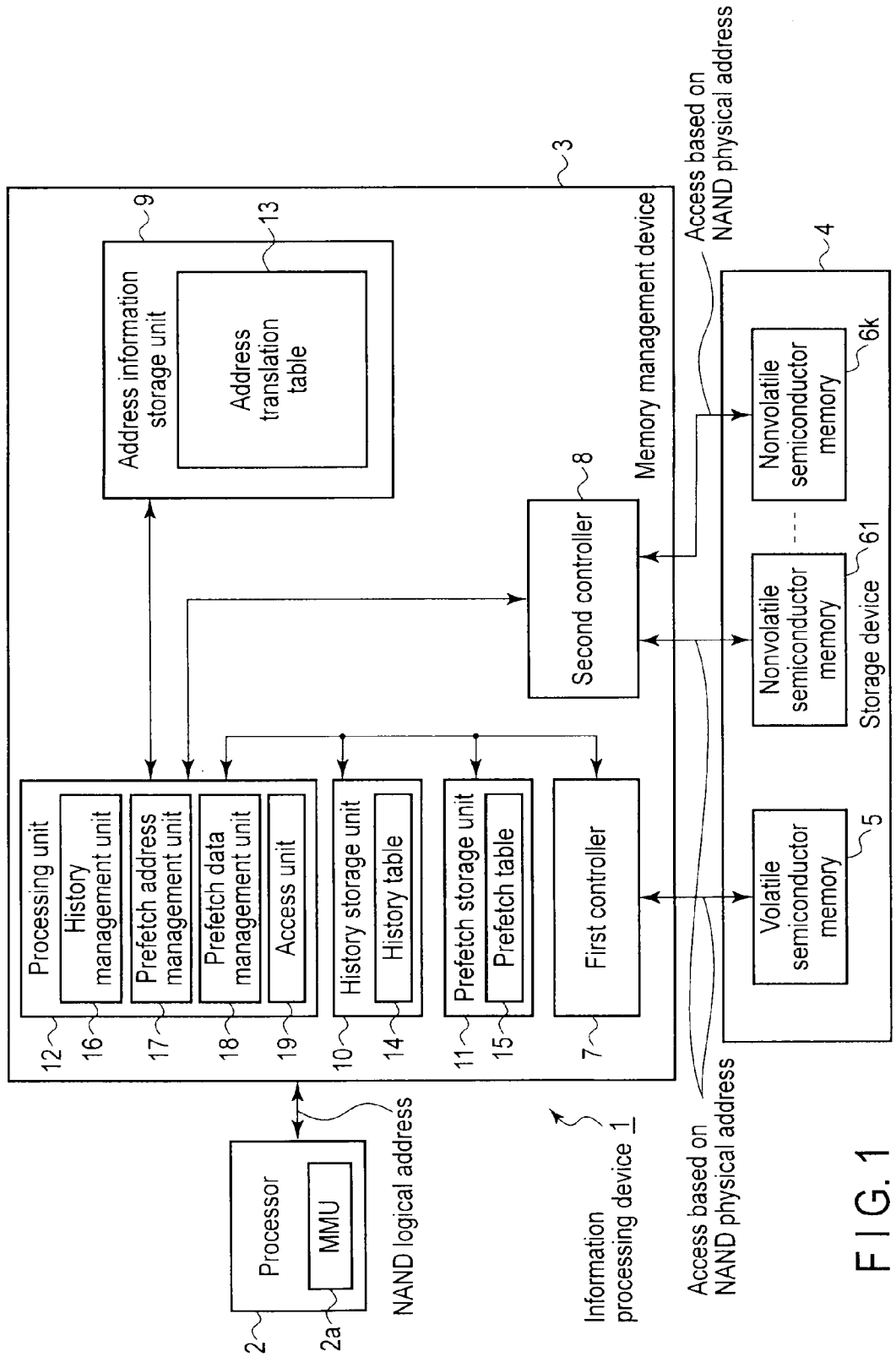
F I G. 1

Address translation table 13

| NAND logical address | NAND physical address | Valid/invalid | Prefetch address | Access interval | Access count | Error count | Hit count |
|---|---|---|---|---|---|---|---|
| (A) | (B) | 1 | (B+1) | t ⋯ z | 10 | 2 | 8 |
| | | | | | | | |
| | | | | | | | |
| | | | | | | | |
| | | | | | | | |

F I G. 5

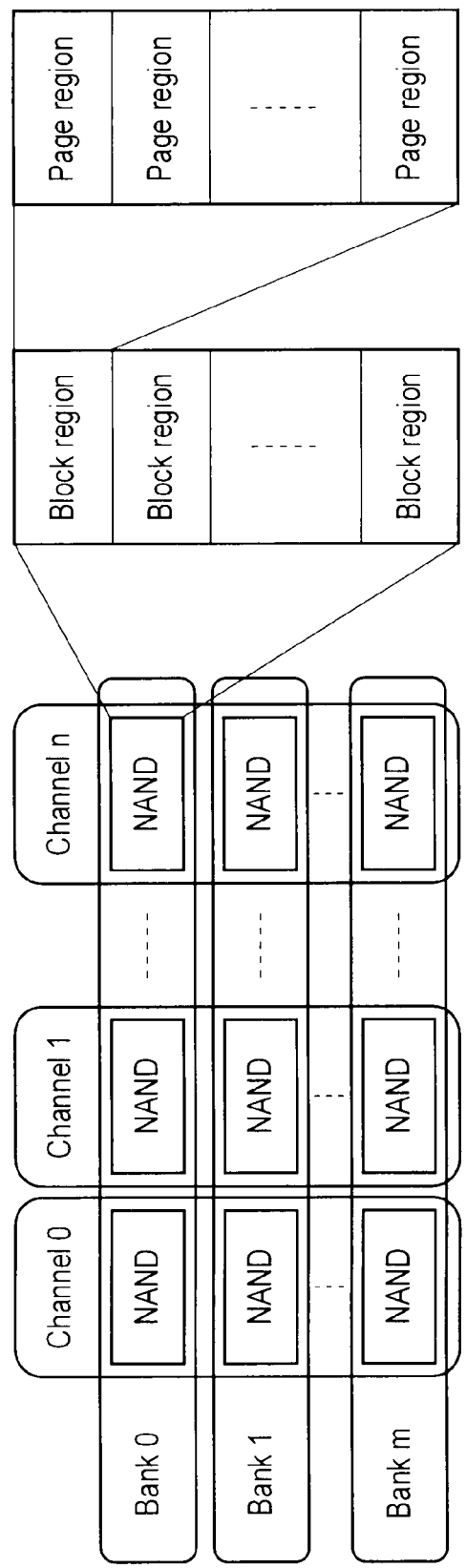
F I G. 6

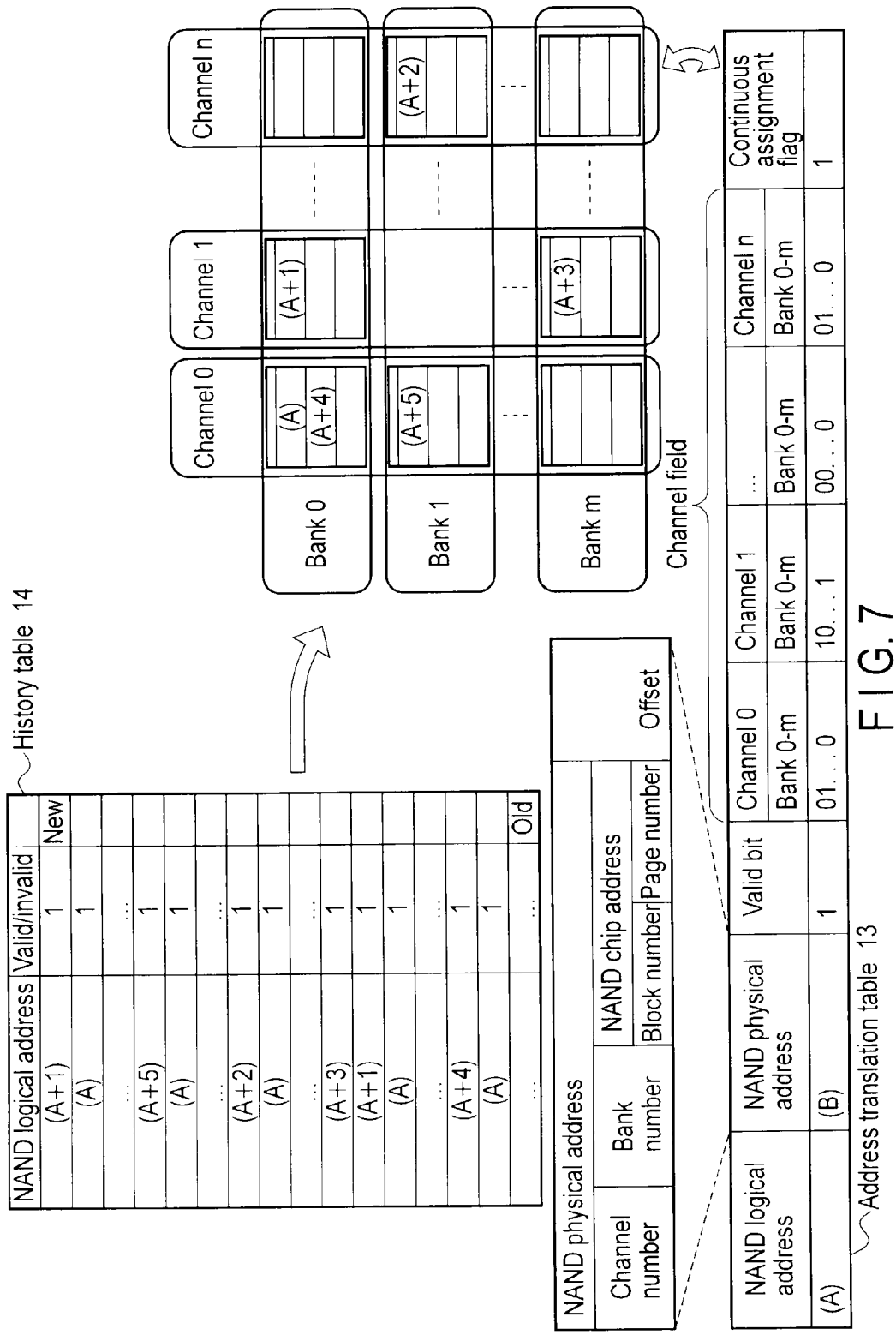
F I G. 7

Address translation table 13

| NAND logical address | NAND physical address | Valid/invalid | Prefetch address (NAND physical address) |
|---|---|---|---|
| NAND logical address(A) | NAND physical address(B) | 1 | Prefetch address(A+1) |
| NAND logical address(A−1) | NAND physical address(B−1) | 1 | Prefetch address(A) |
| NAND logical address(A+1) | NAND physical address(B+1) | 1 | |

* Table is managed on page basis
* Valid/invalid : 1 Valid, 0 invalid

History table 14

| NAND logical address | Valid/invalid | |
|---|---|---|
| NAND logical address(A+1) | 1 | ← New |
| NAND logical address(A) | 1 | |
| NAND logical address(A−1) | 1 | |
| | 0 | |
| | 0 | |
| | 0 | ↓ Old |

Prefetch table 15

| NAND physical address | Valid/invalid | Prefetch data |
|---|---|---|
| NAND physical address(A) | 1 | Prefetch data(D+1) |
| NAND physical address(A−1) | 1 | Prefetch data(D) |
| | | |
| | | |

F I G. 8

MEMORY MANAGEMENT DEVICE AND METHOD FOR MANAGING ACCESS TO A NONVOLATILE SEMICONDUCTOR MEMORY

CROSS-REFERENCE TO RELATED APPLICATIONS

This application is based upon and claims the benefit of priority from prior Japanese Patent Application No. 2010-209997, filed Sep. 17, 2010, the entire contents of which are incorporated herein by reference.

FIELD

Embodiments described herein relate generally to a memory management device and method for managing access to a nonvolatile semiconductor memory.

BACKGROUND

There is conventionally used a technique of providing a temporary storage device accessible faster than a nonvolatile semiconductor memory and increasing access speed by causing the temporary storage device to store data stored in the nonvolatile semiconductor memory.

In this conventional access speed-up technique, out of continuous data stored in the nonvolatile semiconductor memory, data to be accessed next is stored in the temporary storage device in advance. Access to the continuous data is executed for the temporary storage device.

BRIEF DESCRIPTION OF THE DRAWINGS

FIG. 1 is a block diagram showing an example of an arrangement of a memory management device according to a first embodiment;

FIG. 5 is a view showing an example of an address translation table according to a second embodiment;

FIG. 6 is a view showing an example of an arrangement of nonvolatile semiconductor memories according to a third embodiment;

FIG. 7 is a view showing a relationship between an address translation table, a history table, and an assignment result according to the third embodiment;

FIG. 8 is a view showing an example of an arrangement of an address translation table, a history table, and a prefetch table according to a fourth embodiment;

DETAILED DESCRIPTION

Figure 2:
FIG. 2 is a view showing arrangement examples of an address translation table, a history table, and a prefetch table according to the first embodiment.

In general, according to embodiments, a memory management device includes a history management unit, an address translation table, an address management unit, and a data management unit. The history management unit manages an access history for data stored in a nonvolatile semiconductor memory. The address translation table includes a translation table of a logical address and a physical address corresponding to the data. The address management unit specifies, based on the access history, second data to be accessed after access to first data being stored in the nonvolatile semiconductor memory, and registers a second physical address corresponding to the second data in the address translation table in association with a first logical address corresponding to the first data. The data management unit reads out the second data from the nonvolatile semiconductor memory to a buffer.

The embodiments will now be described with reference to the accompanying drawings. Note that the same reference numerals denote the same or almost the same elements throughout the drawings, and a description thereof will be omitted or simplified. Only different portions will be explained in detail.

(First Embodiment)

FIG. 1 is a block diagram showing an example of an arrangement of a memory management device according to this embodiment.

An information processing device 1 includes a processor 2, a memory management device 3, and a storage device 4. The processor 2 and the memory management device 3 may be formed from, for example, System-on-a-Chip (SoC).

The memory management device 3 receives an address of access target data from the processor 2, and returns an access result to the processor 2. In this embodiment, access indicates an operation concerning at least one of read and write.

For example, upon receiving a logical address of read target data from the processor 2, the memory management device 3 translates the logical address into a physical address, reads out the read target data corresponding to the physical address from the storage device 4, and returns the read target data to the processor 2.

In addition, for example, upon receiving write target data and its logical address from the processor 2, the memory management device 3 translates the logical address into a physical address, and writes the write target data at a position of the storage device 4 corresponding to the physical address. The memory management device 3 then returns information representing success/failure of the write to the processor 2.

The storage device 4 is used as a main memory of the information processing device 1, and includes a volatile semiconductor memory 5 and nonvolatile semiconductor memories 61 to 6k. In this embodiment, a sufficient memory capacity is allocated to the nonvolatile semiconductor memories 61 to 6k. The memory capacity of the nonvolatile semiconductor memories 61 to 6k is larger than that of the volatile semiconductor memory 5. Data having a high possibility (probability) to be accessed such as recently accessed data or data of high use frequency is cached from the nonvolatile semiconductor memories 61 to 6k to the volatile semiconductor memory 5. When the processor 2 accesses the volatile semiconductor memory 5 and the access target data does not exist in the volatile semiconductor memory 5, data transfer is executed between the nonvolatile semiconductor memories 61 to 6k and the volatile semiconductor memory 5. When the volatile semiconductor memory 5 and the nonvolatile semiconductor memories 6$_1$ to 6$_k$ are used in combination, a memory space larger than the memory capacity of the volatile semiconductor memory 5 can be used as the main memory.

In this embodiment, the volatile semiconductor memory 5 may be, for example, a DRAM (Dynamic Random Access Memory). However, not the DRAM but any other memory usable as the main memory of a computer, for example, an FPM-DRAM (Fast Page Mode DRAM), an EDO-DRAM (Extended Data Out DRAM), or an SDRAM (Synchronous DRAM) may be used as the volatile semiconductor memory 5. Alternatively, a nonvolatile random access memory such as an MRAM (Magnetoresistive Random Access Memory) or an FeRAM (Ferroelectric Random Access Memory) may be used in place of the volatile semiconductor memory 5 if it enables random access as fast as a DRAM and substantively has no limit on the maximum allowable access count.

In this embodiment, each of the nonvolatile semiconductor memories 6$_1$ to 6$_k$ may be, for example, a NAND flash memory. However, another nonvolatile semiconductor memory such as a NOR flash memory may be used as the nonvolatile semiconductor memories 6$_1$ to 6$_k$.

The volatile semiconductor memory 5 is accessible faster than the nonvolatile semiconductor memories 6$_1$ to 6$_k$, although the capacity is smaller (for example, 128 Mbyte to 4 Gbyte).

The nonvolatile semiconductor memories 6$_1$ to 6$_k$ have a capacity larger (for example, 32 Gbyte to 512 Gbyte) than that of the volatile semiconductor memory 5, although the access time is longer. If a NAND flash memory is used as the nonvolatile semiconductor memories 6$_1$ to 6$_k$, as in this embodiment, write and read are executed on the page basis. Erase is performed for each block unit including a plurality of pages.

The processor 2 executes various kinds of programs. A CPU (Central Processing Unit) is used as the processor 2 of this embodiment. However, any other processing unit such as an MPU (Micro Processor Unit) or a GPU (Graphic Processor Unit) may be used. An MMU (Memory Management Unit) 2a of the processor 2 translates a CPU logical address into a NAND physical address (CPU physical address). A NAND logical address is transmitted from the processor 2 to the memory management device 3 as an address for specifying the access destination.

For example, the processor 2 and the memory management device 3 can asynchronously operate. When the processor 2 is executing processing, the memory management device 3 can execute wear leveling, garbage collection, or compaction for the nonvolatile semiconductor memories 6$_1$ to 6$_k$.

The memory management device 3 includes a first controller 7, a second controller 8, an address information storage unit 9, a history storage unit 10, a prefetch storage unit 11, and a processing unit 12.

The first controller 7 is, for example, a DRAM controller and controls access to the volatile semiconductor memory 5 used as a cache memory.

The second controller 8 is, for example, a NAND controller and controls access to the nonvolatile semiconductor memories 6$_1$ to 6$_k$.

The address information storage unit 9, the history storage unit 10, and the prefetch storage unit 11 have the same characteristic features as those of the volatile semiconductor memory 5. That is, they are accessible faster than the nonvolatile semiconductor memories 6$_1$ to 6$_k$ and have a maximum allowable access count larger than that of the nonvolatile semiconductor memories 6$_1$ to 6$_k$. Note that at least one of the address information storage unit 9, the history storage unit 10, and the prefetch storage unit 11 may be implemented by the volatile semiconductor memory 5. The address information storage unit 9, the history storage unit 10, the prefetch storage unit 11, and the volatile semiconductor memory 5 can freely be combined.

The address information storage unit 9 includes an address translation table 13. The address translation table 13 stores, for each entry, a NAND logical address of the nonvolatile semiconductor memories 6$_1$ to 6$_k$ managed by the CPU, a NAND physical address managed by the processing unit 12, and an address (prefetch address) corresponding to data (prefetch data, or second data) to be prefetched upon occurrence of access to the NAND logical address or the NAND physical address of the entry in association with each other. Details of the address translation table 13 will be described later.

The history storage unit 10 includes a history table 14 including an access history for data stored in the nonvolatile semiconductor memories 6$_1$ to 6$_k$. Details of the history table 14 will be described later.

The prefetch storage unit 11 includes a prefetch table 15 that stores, in advance, second data having a high possibility to be accessed within a predetermined range (for example, access count or access time) after access that has occurred for a NAND physical address corresponding to first data. The prefetch table 15 manages, for each entry, a NAND physical address and the second data (prefetch data) likely to be accessed within a predetermined range after access to the NAND physical address. Details of the prefetch table 15 will be described later.

The processing unit 12 executes various kinds of advanced access control for the storage device 4. For example, the processing unit 12 executes wear leveling, garbage collection, and compaction for the nonvolatile semiconductor memories 6$_1$ to 6$_k$ via the second controller 8.

The processing unit 12 translates a NAND logical address received from the processor 2 into a NAND physical address based on the address translation table 13, and executes access to the storage device 4 or the prefetch storage unit 11 based on the NAND physical address.

The processing unit 12 executes cache control to store the data having the high possibility to be accessed in the volatile semiconductor memory 5 via the first controller 7 based on at least one of the past access time, access frequency, and access count of the data.

The processing unit 12 writes back data stored in the volatile semiconductor memory 5 and data stored in the prefetch storage unit 11 to the nonvolatile semiconductor memories 6$_1$ to 6$_k$ as needed, thereby maintaining coherency of data contents.

The processing unit 12 includes a history management unit 16, a prefetch address management unit 17, a prefetch data management unit 18, and an access unit 19.

The history management unit 16 registers the access history for the nonvolatile semiconductor memories 6$_1$ to 6$_k$ in the history table 14. Details of the history management unit 16 will be described later.

The prefetch address management unit 17 registers a prefetch address by associating the prefetch address with at least one of a NAND logical address and a NAND physical address in the address translation table 13 based on the history table 14. The prefetch address is an address having a high possibility to be accessed after access to a NAND logical address or a NAND physical address. Details of the prefetch address management unit 17 will be described later.

The prefetch data management unit 18 stores prefetch data having a high possibility to be accessed after access to a NAND physical address in the prefetch table 15 in advance. Details of the prefetch data management unit 18 will be described later.

When access target data is stored in the prefetch table 15, the access unit 19 accesses the access target data stored in the prefetch table 15.

If the access target data is not stored in the prefetch table 15, the access unit 19 accesses the access target data stored in the volatile semiconductor memory 5 or the nonvolatile semiconductor memories 61 to 6k via the first controller 7 or the second controller 8.

The processing unit 12 may execute the above-described control by hardware or software such as firmware.

FIG. 2 is a view showing arrangement examples of the address translation table 13, the history table 14, and the prefetch table 15 according to this embodiment.

The history table 14 manages addresses accessed in the past in such a form that allows to identify the access order. In the history table 14, the entry sequence corresponds to the access order. Valid/invalid information represents whether an entry is valid.

The history table 14 in FIG. 2 indicates that access has occurred in the order of NAND logical addresses (A−1), (A) and (A+1).

In this embodiment, an example will be explained in which NAND physical addresses are registered in the history table 14. However, for example, NAND logical addresses or the like may be registered.

The address translation table 13 manages, for each entry, a NAND logical address, a NAND physical address, valid/invalid information, and a prefetch address.

Each entry of the address translation table 13 associates the NAND logical address and the NAND physical address of each data stored in the nonvolatile semiconductor memories 61 to 6k with each other. Valid/invalid information in the address translation table 13 represents whether an entry is valid.

The prefetch address of each entry of the address translation table 13 is an address having a high possibility to be accessed within a predetermined range after access to the NAND logical address or the NAND physical address of the entry. That is, the prefetch address is an address representing data (prefetch data) to be prefetched, which has a high possibility of access after access to given data. In this embodiment, an example will be described in which a NAND physical address is used as a prefetch address. However, for example, a NAND logical address or the like may be used.

In the address translation table 13 shown in FIG. 2, a NAND logical address (A) is translated into a NAND physical address (B). A prefetch address (B+1) indicates prefetch data (D+1) to be prefetched upon occurrence of access to data (D) corresponding to the NAND logical address (A) and the NAND physical address (B). In the address translation table 13 shown in FIG. 2, the prefetch address (B+1) is associated with the NAND logical address (A) and the NAND physical address (B). In each entry of the prefetch table 15, a NAND logical address, a NAND physical address, valid/invalid information representing validity or invalidity of the entry, and prefetch data having a high possibility to be accessed within a predetermined range after access to the NAND physical address are associated with each other. In the prefetch table 15, a NAND physical address and prefetch data are associated. Instead, a NAND logical address and prefetch data may be associated.

In the prefetch table 15 shown in FIG. 2, the prefetch data (D+1) is stored in association with the NAND physical address (B). In addition, the prefetch data (D) is stored in association with a NAND physical address (B−1).

Note that in this embodiment, the NAND physical address (B) and the prefetch data (D+1) having a high possibility to be accessed after the NAND physical address (B) are associated in the prefetch table 15. Instead, the prefetch address (B+1) and the data (D+1) corresponding to the prefetch address (B+1) may be stored in the prefetch table 15 in association with each other.

The operations of the history management unit 16, the prefetch address management unit 17, the prefetch data management unit 18, and the access unit 19 shown in FIG. 1 will be described below in detail with reference to the tables 13 to 15 shown in FIG. 2.

The history management unit 16 registers the accessed NAND logical addresses (A−1), (A), and (A+1) in the history table 14 in such a form that allows to identify the access order.

The prefetch address management unit 17 registers prefetch addresses in the address translation table 13 based on the history table 14.

First, the prefetch address management unit 17 translates the NAND logical addresses (A−1), (A), and (A+1) in the history table 14 into NAND physical addresses (B−1), (B), and (B+1), respectively, using the address translation table 13.

Next, the prefetch address management unit 17 recognizes that the NAND physical address (B) has been accessed within a predetermined range after the NAND physical address (B−1). The prefetch address management unit 17 registers the NAND physical address (B) accessed after the NAND physical address (B−1) as the prefetch address (B) associated with the NAND physical address (B−1) in a valid entry of the address translation table 13.

When access to the NAND physical address (B) has occurred, the prefetch data management unit 18 reads out the prefetch data (D+1) indicated by the prefetch address (B+1) corresponding to the NAND physical address (B) from the nonvolatile semiconductor memories 61 to 6k by looking up the address translation table 13. The prefetch data management unit 18 stores the prefetch data (D+1) in the prefetch table 15 in association with the NAND physical address (B).

The access unit 19 looks up the address translation table 13 and the prefetch table 15, and if access target data is stored in the prefetch table 15, executes access to the prefetch table 15.

If the access target data is not stored in the prefetch table 15, the access unit 19 executes access to the volatile semiconductor memory 5 or the nonvolatile semiconductor memories 61 to 6k.

Figure 3:
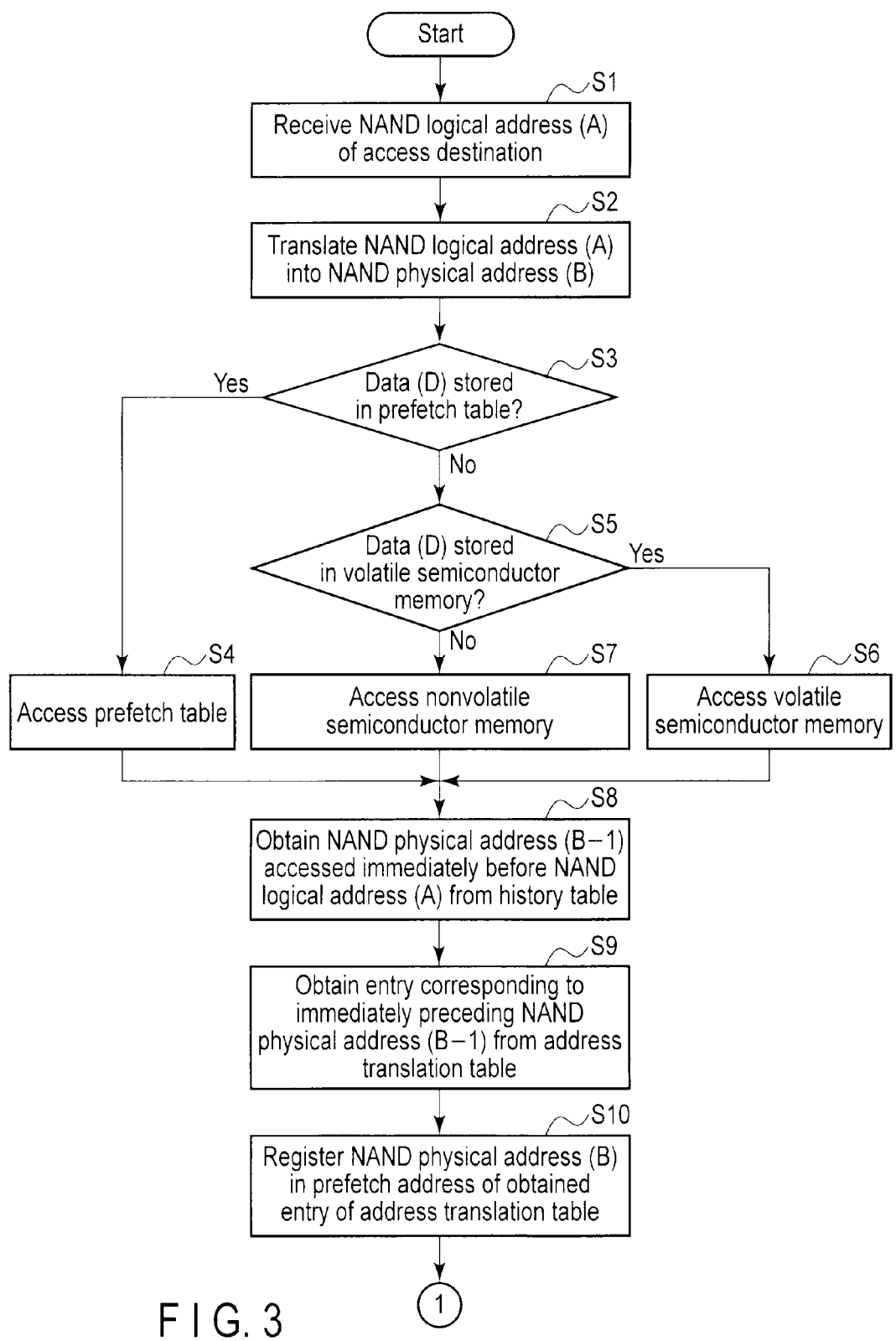
FIG. 3 is a flowchart illustrating an example of a first half of an access operation of a processing unit of the memory management device according to the first embodiment.

FIG. 3 is a flowchart illustrating an example of a first half of an access operation of the processing unit 12 of the memory management device 3 according to this embodiment.

Figure 4:
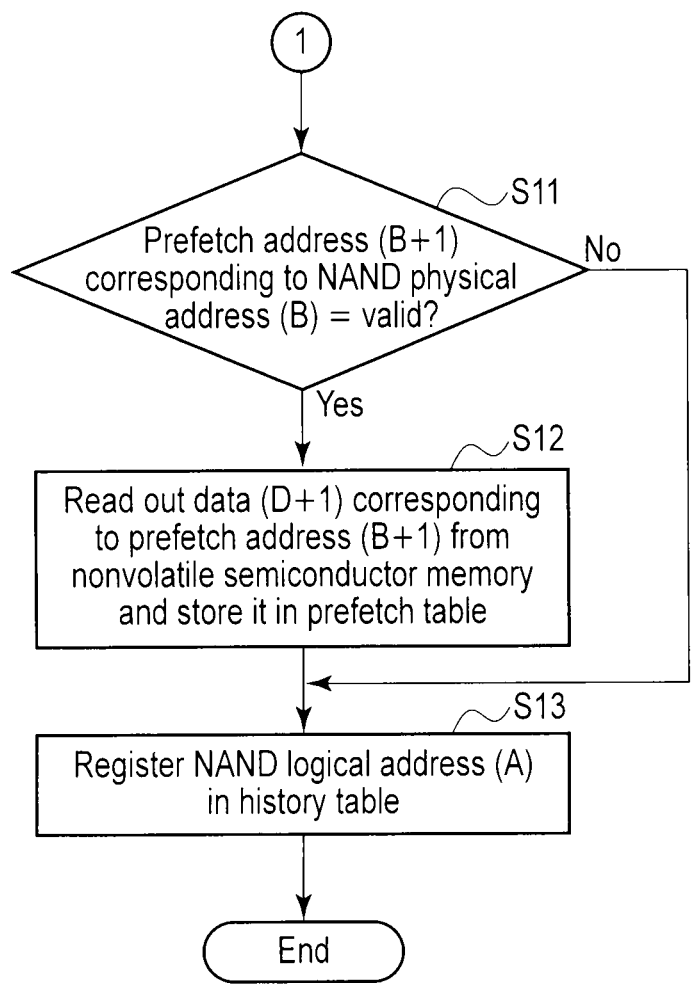
FIG. 4 is a flowchart illustrating an example of a second half of the access operation of the processing unit of the memory management device according to the first embodiment.

FIG. 4 is a flowchart illustrating an example of a second half of the access operation of the processing unit 12 of the memory management device 3 according to this embodiment.

The access unit 19 of the processing unit 12 receives the NAND logical address (CPU logical address) (A) of the access destination from the processor 2 (step S1).

The access unit 19 translates the received NAND logical address (A) into the NAND physical address (B) by looking up the address translation table 13 (step S2).

The access unit 19 determines whether the data (D) corresponding to the NAND physical address (B) is stored in the prefetch table 15 (step S3).

If the data (D) is stored in the prefetch table 15, the access unit 19 accesses the data (D) stored in the prefetch table 15 (step S4). After that, the process advances to step S8.

If the data (D) is not stored in the prefetch table 15, the access unit 19 determines whether the data (D) corresponding to the NAND physical address (B) is stored in the volatile semiconductor memory 5 (step S5).

If the data (D) corresponding to the NAND physical address (B) is stored in the volatile semiconductor memory 5, the access unit 19 accesses the data (D) corresponding to the NAND physical address (B) in the volatile semiconductor memory 5 via the first controller 7 (step S6). After that, the process advances to step S8.

If the data (D) corresponding to the NAND physical address (B) is not stored in the volatile semiconductor memory 5, the access unit 19 accesses the data (D) stored in the nonvolatile semiconductor memories 61 to 6k (step S7).

The prefetch address management unit 17 of the processing unit 12 obtains, from the history table 14, the NAND logical address (A−1) accessed immediately before the NAND logical address (A), and translates the immediately preceding NAND logical address (A−1) into the NAND physical address (B−1) based on the address translation table 13 (step S8).

The prefetch address management unit 17 obtains an entry corresponding to the NAND physical address (B−1) from the entries of the address translation table 13 (step S9).

The prefetch address management unit 17 registers the NAND physical address (B) in the prefetch address of the entry corresponding to the immediately preceding NAND physical address (B−1) obtained (step S10).

The prefetch data management unit 18 determines whether the prefetch address (B+1) registered in the entry of the address translation table 13 corresponding to the NAND physical address (B) is valid (step S11).

If the prefetch address (B+1) is not valid, the process advances to step S13.

If the prefetch address (B+1) is valid, the prefetch data management unit 18 prefetches the data (D+1) corresponding to the prefetch address (B+1) from the nonvolatile semiconductor memories 61 to 6k, and stores it in the prefetch table 15 (step S12).

The history management unit 16 registers the NAND logical address (A) in the history table 14 (step S13).

In the above-described embodiment, in correspondence with an address in the address translation table 13, a prefetch address having a high possibility to be accessed after access to that address is registered. This allows to, upon occurrence of access to the first data, read out the second data having the high possibility of access after the access to the first data from the nonvolatile semiconductor memories 61 to 6k in advance and prepare the second data in the prefetch storage unit 11 accessible at a high speed. In this embodiment, even for discontinuous data, the efficiency of access to the nonvolatile semiconductor memories 61 to 6k can be improved based on the access history. This enables to increase an access speed and improve an access performance.

In this embodiment, the count of access to the nonvolatile semiconductor memories 61 to 6k can be reduced. Hence, the nonvolatile semiconductor memories 61 to 6k can have a longer life.

In this embodiment, a NAND physical address is used as a prefetch address. This allows to improve a degree of freedom in rearrangement of data to be written in the nonvolatile semiconductor memories 61 to 6k and a reliability of access to the nonvolatile semiconductor memories 61 to 6k.

Note that in this embodiment, an absolute address of prefetch data is used as a prefetch address.

For example, assume that the address translation table 13 has an entry in which the NAND logical address (A) before translation is associated with the NAND physical address (B) after translation. If the same NAND logical address (A) as that before translation or the same NAND physical address (B) as that after translation is registered as the prefetch address in this entry, prefetch is not executed.

In addition, prefetch valid/invalid information representing whether a prefetch address is valid or not may be added to as an item of the address translation table 13. The prefetch may be performed only when the prefetch valid/invalid information indicates valid.

(Second Embodiment)

In this embodiment, first to fifth modifications of the above-described first embodiment will be explained.

<First Modification>

In the first modification, an address translation table 13 may specify a prefetch address using a relative address.

For example, assume that the address translation table 13 has an entry in which a NAND logical address (A) before translation and a NAND physical address (B) after translation are associated with each other, and a relative address (N) representing the relative position from the NAND physical address (B) is registered in the prefetch address. In this entry, the prefetch address having a high possibility to be accessed after access to the NAND physical address (B) is a NAND physical address (B+N). For example, when the prefetch address is 0, prefetch is not executed.

In the first modification, when the total number of addresses of nonvolatile semiconductor memories 61 to 6k is $2^n$, the information amount of the prefetch address can be made smaller than n, and the data capacity of the address translation table 13 can be reduced.

In the first modification, setting is done not to perform prefetch for an area outside an accessible range of the nonvolatile semiconductor memories 61 to 6k.

<Second Modification>

In the second modification, the address translation table 13 may register a plurality of prefetch addresses in each entry.

In the second modification, the prefetch address management unit 17 registers a plurality of prefetch addresses in an entry of the address translation table 13.

The prefetch data management unit 18 looks up the address translation table 13, and if a plurality of prefetch addresses are associated with the accessed NAND physical address, repeatedly stores data corresponding to the prefetch addresses in the prefetch table 15. This allows to improve the hit ratio of the prefetch table 15.

<Third Modification>

FIG. 5 is a view showing an example of the address translation table 13 according to this modification.

In the third modification, the address translation table 13 includes a field to register an access interval.

As the access interval, for example, an access time or an access count is used.

Using an access time as the access interval will be described.

For example, assume that an access pattern is obtained from a history table 14 in which the access time from access to the NAND logical address (A) to access to a NAND logical address (A+1) is t.

In this case, the NAND logical address (A), the NAND physical address (B), a NAND physical address (B+1) serving as the prefetch address, and the access time t are associated in the address translation table 13.

When time (t×a+b) has elapsed from access to the NAND logical address (A), the prefetch data management unit 18 stores data (D+1) corresponding to the prefetch address (B+1) in the prefetch table 15. Note that a and b are constants to be used to calculate the prefetch execution timing based on the access time t. The time (t×a+b) is shorter than the time t.

The prefetch data management unit 18 can thus store the prefetch data (D+1) in the prefetch table 15 at an arbitrary timing before the elapse of the access time t.

Using an access count as the access interval will be described next.

For example, assume that an access pattern is obtained from a history table 14 in which access to the NAND logical address (A+1) occurs after access to the NAND logical address (A) has occurred z times.

In this case, the NAND logical address (A), the NAND physical address (B), the prefetch address (B+1), and an access count z are associated in the address translation table 13.

After the NAND logical address (A) has been received (z×v+w) times, the prefetch data management unit 18 stores the data (D+1) corresponding to the prefetch address (B+1) in the prefetch table 15. Note that v and w are constants to be used to calculate the prefetch execution timing based on the access count z. The value (z×v+w) is smaller than z.

The prefetch data management unit 18 can thus store the prefetch data (D+1) in the prefetch table 15 at an arbitrary timing before access is executed z times.

In the above-described third modification, the prefetch execution timing can be controlled based on the access interval such as the access time or the access count, thereby improving the efficiency of the prefetch operation.

<Fourth Modification>

In the fourth modification, if the access target data is not stored in the prefetch table 15 (in case of a prefetch error), the prefetch address management unit 17 updates the prefetch address in the entry of the address translation table 13.

For example, assume that the NAND logical address (A), the NAND physical address (B), and the NAND physical address (B+1) serving as a prefetch address are registered in the entry of the address translation table 13. Also assume that the access destination after the NAND physical address (B) of the entry is a NAND physical address (B+10) that is different from the prefetch address (B+1) of the entry, and data (D+10) corresponding to the NAND physical address (B+10) is not stored in the prefetch table 15.

In this case, the prefetch address management unit 17 updates the prefetch address in the entry of the address translation table 13 from (B+1) to (B+10).

The prefetch data management unit 18 stores the data (D+10) in the prefetch table 15.

In the fourth modification, the prefetch address and the prefetch data are updated based on the latest access history. This allows to improve the prefetch data hit ratio.

<Fifth Modification>

In the fifth modification, the prefetch address management unit 17 counts the hit count and the error count concerning a prefetch address for each entry of the address translation table 13, and registers the result. The hit count is the number of times of access occurrence for a prefetch address corresponding to an address within a predetermined range after access to the address. On the other hand, the error count is the number of times of access nonoccurrence for a prefetch address corresponding to an address within a predetermined range after access to the address.

For an entry in which the error count is larger than the hit count, the prefetch address management unit 17 updates the prefetch address of the entry and initializes (clears) the hit count and the error count of the entry.

Note that the prefetch address management unit 17 may count the access count and the error count or the access count and the hit count for each entry of the address translation table 13 and register the result.

In this case, the prefetch address management unit 17 determines, based on the access count and the error count or the access count and the hit count, whether to update the prefetch address of an entry. For example, if the error count/access count of an entry exceeds a predetermined threshold, the prefetch address management unit 17 updates the prefetch address of the entry and initializes the access count and the error count of the entry. Alternatively, if the hit count/access count of an entry is smaller than a predetermined threshold, the prefetch address management unit 17 updates the prefetch address of the entry and initializes the access count and the hit count of the entry.

In the fifth modification, prefetch address update control can be done in the address translation table 13 in accordance with various conditions. This allows to improve the prefetch data hit ratio.

(Third Embodiment)

In this embodiment, efficient prefetch address assignment to prefetch data will be described.

FIG. 6 is a view showing an example of an arrangement of the nonvolatile semiconductor memories 61 to 6k according to this embodiment.

In the nonvolatile semiconductor memories 61 to 6k shown in FIG. 6, block units each including a plurality of block regions are arranged in a matrix.

Out of the block units arranged in the matrix, block units belonging to the same row belong to the same bank.

Out of the block units arranged in the matrix, block units belonging to the same column belong to the same channel.

If each of the nonvolatile semiconductor memories 61 to 6k is a NAND flash memory, each of the plurality of block regions belongs to one of banks 0 to m and one of channels 0 to n. Each block region includes a plurality of page regions. Hence, the plurality of page regions are divided using the plurality of channels and the plurality of banks. A bank number and a channel number are assigned to each page region.

In the nonvolatile semiconductor memories 61 to 6k, different channels are accessible simultaneously.

In the nonvolatile semiconductor memories 61 to 6k, different banks are accessible simultaneously.

In the nonvolatile semiconductor memories 61 to 6k, access to continuous page regions can be done faster than access to discontinuous page regions.

The speed of simultaneous access to different channels, that of simultaneous access to different banks, and that of access to continuous page regions are compared. Simultaneous access to different channels is the fastest, simultaneous access to different banks is the second fastest, and access to continuous page regions is the third fastest.

A prefetch address management unit 17 according to this embodiment recognizes a free data area by looking up an address translation table 13, and arranges prefetch data based on the above-described relationship.

The prefetch address management unit 17 assigns NAND physical addresses to the address of given data and a plurality of prefetch addresses corresponding to this data such that at least one of the channel and bank is different.

The prefetch address management unit 17 also assigns NAND physical addresses to given data and prefetch data such that, for example, the address of the data and the prefetch address for the data continue.

Address assignment by the prefetch address management unit 17 is executed when NAND physical address rearrangement for the nonvolatile semiconductor memories 61 to 6k is necessary like when executing, for example, wear leveling or garbage collection.

Address assignment based on the history table 14 will be described below in detail.

FIG. 7 is a view showing a relationship between the address translation table 13, the history table 14, and an assignment result according to this embodiment.

The NAND physical address in the address translation table 13 includes a channel number, a bank number, a NAND chip address including a block number and a page number, and an offset.

In this embodiment, the history table 14 registers a NAND logical address (CPU physical address) received by the memory management device 3.

For example, assume that information representing that the NAND logical address (A+1) was accessed next to the NAND logical address (A) is registered in the history table 14.

For example, assume that information representing that the NAND logical address (A+5) was accessed next to the NAND logical address (A) is registered in the history table 14.

For example, assume that information representing that the NAND logical address (A+2) was accessed next to the NAND logical address (A) is registered in the history table 14.

For example, assume that information representing that the NAND logical address (A+1) was accessed next to the NAND logical address (A), and the NAND logical address (A+3) was accessed then is registered in the history table 14.

For example, assume that information representing that the NAND logical address (A+4) was accessed next to the NAND logical address (A) is registered in the history table 14.

If such an access pattern is registered in the history table 14, the prefetch address management unit 17 assigns NAND physical addresses to the NAND logical addresses (A+1), (A+2), (A+3), and (A+5) such that at least one of the channel and bank is different, and the NAND chip address to be used in the channel and bank is the same.

The prefetch address management unit 17 also assigns NAND physical addresses that are continuous in the same channel and same bank to the NAND logical address (A) and the prefetch address (A+4).

In FIG. 7, each entry of the address translation table 13 has a channel field of n×m bits. In the channel field, a prefetch address is specified by making the channel and bank where prefetch data is arranged identifiable. That is, in this embodiment, the NAND physical address and the prefetch address share the NAND chip address.

In the address translation table 13 shown in FIG. 7, a flag corresponding to a channel and bank to which a prefetch address is assigned for the NAND logical address (A) before translation and the NAND physical address (B) after translation is represented by "1", and a flag corresponding to a channel and bank to which no prefetch address is assigned is represented by "0".

The prefetch address management unit 17 sets "1" to a bit corresponding to a channel and bank to which a prefetch address is assigned in the address translation table 13.

When the data of the NAND physical address (B) is accessed, the prefetch data management unit 18 simultaneously reads out data designated by a NAND chip address that is the same as the NAND physical address (B) in a channel and bank where the flag is "1", and stores the read prefetch data in the prefetch table 15.

In the address translation table 13 shown in FIG. 7, when prefetch data to be read upon occurrence of access to the data of the NAND physical address (B) is stored in the data area next to the NAND physical address (B), "1" is set to the continuous assignment flag in the entry of the NAND physical address (B) of the address translation table 13.

When access to the NAND physical address (B) has occurred, and the continuous assignment flag is "1", the prefetch data management unit 18 stores, in the prefetch table 15, the prefetch data stored in the data area next to the NAND physical address (B).

In the above-described embodiment, for example, NAND physical addresses can be assigned optimally based on the history table 14 and the address translation table 13 when executing wear leveling or garbage collection.

In this embodiment, it is possible to simultaneously read out prefetch data from a plurality of channels and banks.

In this embodiment, since data and prefetch data are stored in continuous data areas, prefetch data can be read out at a high speed.

In this embodiment, since a plurality of prefetch addresses can be registered in one entry of the address translation table 13, the number of prefetch data can be increased.

In this embodiment, a NAND physical address and a prefetch address share a NAND chip address. This allows to reduce the data capacity necessary for the address translation table 13.

Note that in this embodiment, a relative address is used as a prefetch address in the address translation table 13. If the prefetch address is outside a range that can be referred using the relative address, and no prefetch is performed, the prefetch address management unit 17 accesses the history table 14 to extract the NAND logical addresses (A−1) and (A) accessed continuously and rearrange the data of the NAND logical address (A−1) and the data of the NAND logical address (A) within a range that can be referred using the relative address, thereby updating the address translation table 13.

Even if prefetch data exists outside the range that can be referred using a relative address, prefetch can be performed by rearranging the prefetch data within the range that can be referred using a relative address.

(Fourth Embodiment)

In this embodiment, a case will be described in which a NAND logical address is used as a prefetch address to be registered in an address translation table 13, and a NAND logical address and prefetch data are stored in a prefetch table 15.

FIG. 8 is a view showing an example of an arrangement of the address translation table 13, the history table 14, and the prefetch table 15 according to this embodiment.

In the address translation table 13 shown in FIG. 8, a prefetch address serving as a NAND logical address is associated with a combination of a NAND logical address before translation and a NAND physical address after translation.

In each entry of the prefetch table 15 shown in FIG. 8, a NAND logical address, valid/invalid information representing validity or invalidity of the entry, and prefetch data are associated.

Figure 9:
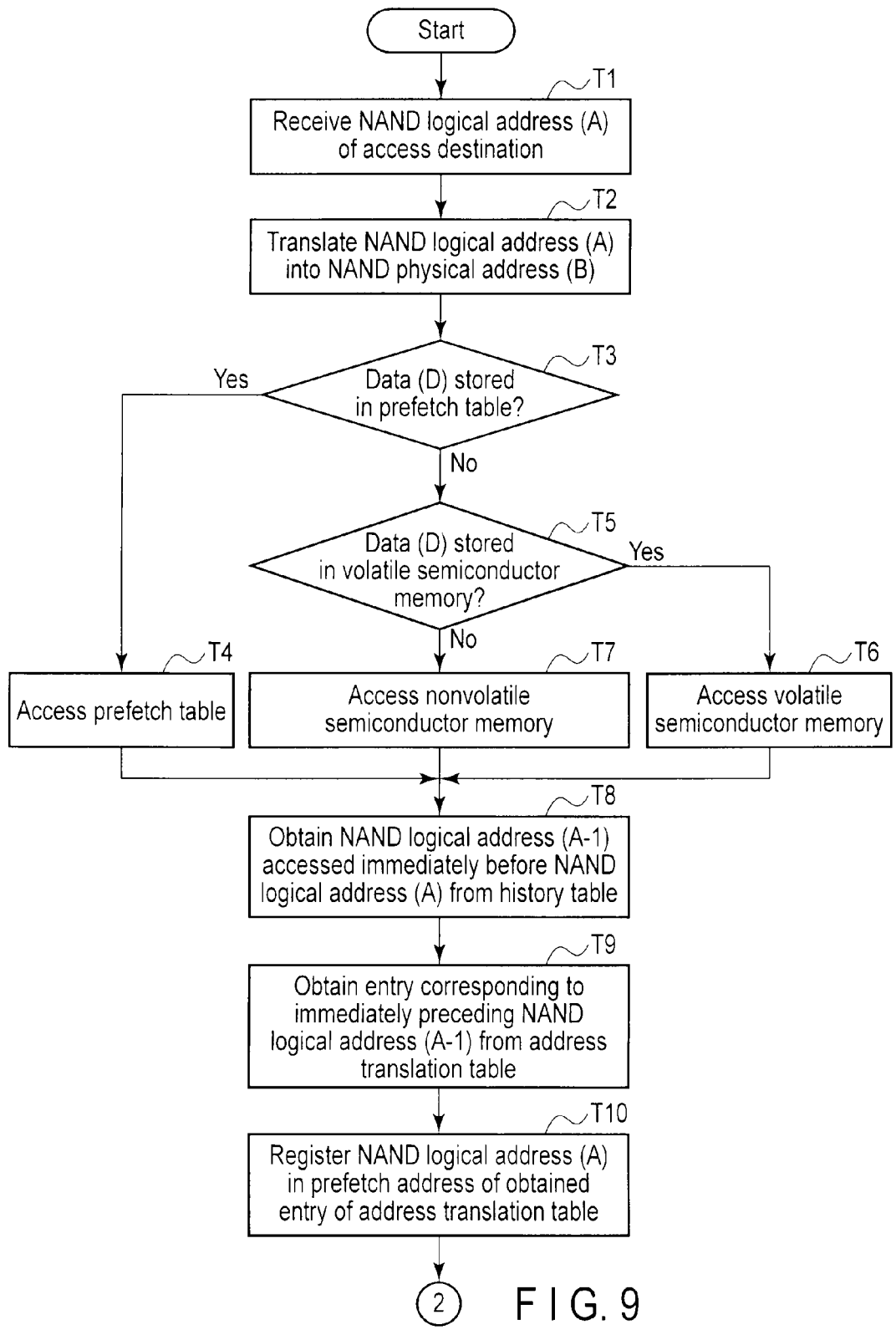
FIG. 9 is a flowchart illustrating an example of a first half of an access operation of a processing unit of a memory management device according to the fourth embodiment.

FIG. 9 is a flowchart illustrating an example of a first half of an access operation of the processing unit 12 of the memory management device 3 according to this embodiment.

Figure 10:
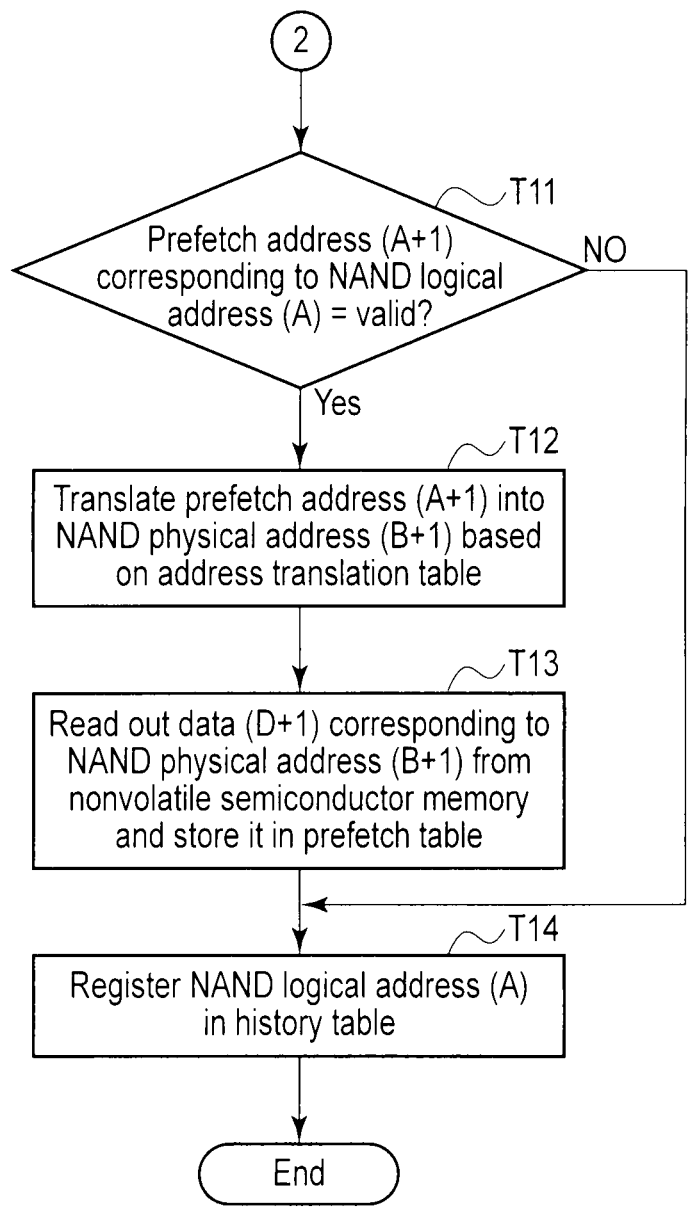
FIG. 10 is a flowchart illustrating an example of a second half of the access operation of the processing unit of the memory management device according to the fourth embodiment.

FIG. 10 is a flowchart illustrating an example of a second half of the access operation of the processing unit 12 of the memory management device 3 according to this embodiment.

An access unit 19 receives a NAND logical address (A) of an access destination from the processor 2 (step T1).

The access unit 19 translates the received NAND logical address (A) into a NAND physical address (B) by looking up the address translation table 13 (step T2).

The access unit 19 determines whether data (D) corresponding to the NAND physical address (B) is stored in the prefetch table 15 (step T3).

If the data (D) is stored in the prefetch table 15, the access unit 19 accesses the data (D) stored in the prefetch table 15 (step T4). After that, the process advances to step T8.

If the data (D) is not stored in the prefetch table 15, the access unit 19 determines whether the data (D) corresponding to the NAND physical address (B) is stored in the volatile semiconductor memory 5 (step T5).

If the data (D) corresponding to the NAND physical address (B) is stored in the volatile semiconductor memory 5, the access unit 19 accesses the data (D) corresponding to the NAND physical address (B) in the volatile semiconductor memory 5 via the first controller 7 (step T6). After that, the process advances to step T8.

If the data (D) corresponding to the NAND physical address (B) is not stored in the volatile semiconductor memory 5, the access unit 19 accesses the data (D) stored in nonvolatile semiconductor memories 61 to 6k (step T7).

A prefetch address management unit 17 of the processing unit 12 obtains, from the history table 14, a NAND logical address (A−1) accessed immediately before the NAND logical address (A) (step T8).

The prefetch address management unit 17 obtains an entry corresponding to the immediately preceding NAND logical address (A−1) from the entries of the address translation table 13 (step T9).

The prefetch address management unit 17 registers the NAND logical address (A) in the prefetch address of the entry corresponding to the immediately preceding NAND logical address (A−1) obtained (step T10).

A prefetch data management unit 18 determines whether the prefetch address (A+1) registered in the entry of the address translation table 13 corresponding to the NAND logical address (A) is valid (step T11).

If the prefetch address (A+1) is not valid, the process advances to step T14.

If the prefetch address (A+1) is valid, the prefetch data management unit 18 translates the prefetch address (A+1) into a NAND physical address (B+1) based on the address translation table 13 (step T12).

The prefetch data management unit 18 then prefetches the data (D+1) corresponding to the NAND physical address (B+1) from the nonvolatile semiconductor memories 61 to 6k, and stores it in the prefetch table 15 (step T13).

A history management unit 16 registers the NAND logical address (A) in the history table 14 (step T14).

In the above-described embodiment, a NAND logical address is used as a prefetch address. In this case, even if a NAND physical address for data is changed or deleted, the prefetch can be executed continuously without lowering the efficiency of the prefetch operation.

(Fifth Embodiment)

In this embodiment, prefetch control by software will be explained.

Figure 11:
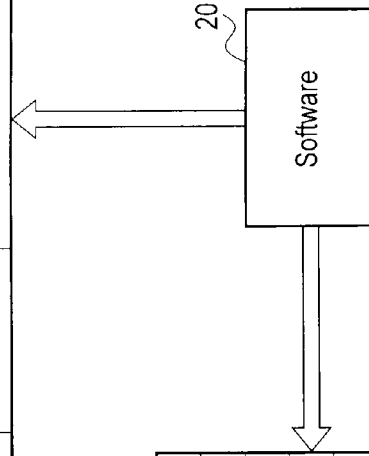
FIG. 11 is a block diagram showing an example of a relationship between a prefetch table, an address translation table, and software according to a fifth embodiment.

FIG. 11 is a block diagram showing an example of a relationship between the prefetch table 15, the address translation table 13, and software according to this embodiment.

In this embodiment, the address translation table 13 has a lock bit representing whether to prohibit prefetch address change. For an entry with a lock bit "1", prefetch address change is prohibited. For an entry with a lock bit "0", prefetch address change is permitted.

In this embodiment, the prefetch table 15 has a lock bit representing whether to prohibit entry change. For an entry with a lock bit "1", change is prohibited. For an entry with a lock bit "0", change is permitted.

Examples of software 20 of this embodiment are an operating system to be executed by the processor 2, application software to be executed by the processor 2, and firmware to be executed by the processing unit 12.

The software 20 changes settings of the address translation table 13 and the prefetch table 15.

The software 20 also sets the lock bits in the address translation table 13 and those in the prefetch table 15 so that registration or storage contents can be locked for each entry.

In the address translation table 13 shown in FIG. 11, a prefetch address (B) is not updated because it is associated with the lock bit "1".

For example, assume that data to be frequently accessed by the operating system is stored in a specific data area of nonvolatile semiconductor memories 61 to 6k. In this case, the software 20 stores the data to be frequently accessed in the prefetch table 15.

Alternatively, for example, assume that prefetch data is deleted from the prefetch table 15 in chronological order when the capacity of the prefetch table 15 exceeds a predetermined value. However, the software 20 sets the lock bit corresponding to the data to be frequently accessed to "1" to prohibit erase of the data so the data to be frequently accessed is not deleted from the prefetch table 15.

In the prefetch table 15 shown in FIG. 11, prefetch data (D+6) is not updated because it is associated with the lock bit "1".

In the above-described embodiment, the prefetch table 15 and the address translation table 13 can statically be set using the software 20.

In this embodiment, the software 20 allows to select whether to automatically execute or lock update of the prefetch table 15 and the address translation table 13.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory management device comprising:
    a history management unit managing an access history for data stored in a nonvolatile semiconductor memory;
    an address translation table including a translation table including a first logical address corresponding with a first physical address of first data and corresponding with a second physical address of second data;
    an address management unit which specifies, based on a frequency of access of second data after access of the first data indicated in the access history, the second data to be accessed after access to the first data being stored in the nonvolatile semiconductor memory, and registers the second physical address corresponding to the second data in the address translation table in association with the first logical address corresponding to the first data; and
    a data management unit which reads out the second data from the nonvolatile semiconductor memory to a buffer.

2. The device according to claim 1, wherein the address management unit registers, in the address translation table in association with the first logical address, at least one of a hit count that is the number of times of an access occurrence for the second data within a first predetermined range after access to the first data and an error count that is the number of times of access nonoccurrence for the second data within a second predetermined range after access to the first data, and updates the second physical address associated with the first logical address based on at least one of the hit count and the error count.

3. The device according to claim 1, wherein
the address translation table registers access pattern information of the first data and the second data, and
the data management unit determines, based on the access pattern information, a timing of reading out the second data to the buffer.

4. The device according to claim 3, wherein
the access pattern information includes an access time interval from access to the first data to access to the second data, and
the data management unit reads out the second data to the buffer within a time shorter than the access time interval from the access to the first data.

5. The device according to claim 3, wherein
the access pattern information includes the number of times of occurrence of access to the first data from access to the first data to access to the second data, and
the data management unit reads out the second data to the buffer before the number of times of access to the first data is reached at the number of times of occurrence of access.

6. The device according to claim 1, wherein
the nonvolatile semiconductor memory is a NAND flash memory,
the logical address is a logical address of the NAND flash memory,
the physical address is a physical address of the NAND flash memory, and
the second physical address is an absolute address or a relative address for a first physical address corresponding to the first logical address.

7. The device according to claim 1, wherein
the address management unit specifies, based on the access history, a plurality of second data to be accessed after access to the first data, and registers a plurality of second physical addresses corresponding to the plurality of second data in the address translation table in association with the first logical address corresponding to the first data, and
the data management unit reads out the plurality of second data to the buffer.

8. The device according to claim 1, wherein
the nonvolatile semiconductor memory comprises a plurality of regions divided into a plurality of channels and a plurality of banks, and
when a plurality of second data exist in correspondence with the first data, the address management unit assigns a plurality of the second data to the same physical address of regions belonging to different channels or regions belonging to different banks.

9. The device according to claim 8, wherein the address management unit assigns the first data and the second data to continuous physical addresses belonging to the same channel and the same bank.

10. The device according to claim 1, further comprising an access unit which translates a logical address into a physical address by referring the address translation table, when access target data corresponding to the translated physical address is stored in the buffer, accesses the access target data stored in the buffer, and when the access target data is not stored in the buffer, accesses the access target data stored in the nonvolatile semiconductor memory.

11. The device according to claim 1, wherein
the history management unit comprises history table, the history table managing accessed logical addresses in a form that allows to identify an access order.

12. A memory management device comprising:
a history management unit managing an access history for data stored in a nonvolatile semiconductor memory;
an address translation table including a translation table including a first logical address corresponding with a first physical address of first data and corresponding with a second logical address of second data;
an address management unit which specifies, based on a frequency of access of second data after access of the first data indicated in the access history, the second data to be accessed after access to the first data being stored in the nonvolatile semiconductor memory, and registers the second logical address corresponding to the second data in the address translation table in association with the first logical address corresponding to the first data; and
a data management unit which reads out the second data from the nonvolatile semiconductor memory to a buffer.

13. The device according to claim 12, wherein the data management unit translates the second logical address into a second physical address corresponding to the second data based on the address translation table, reads out the second data from the nonvolatile semiconductor memory, and stores the second data in the buffer in association with the second logical address.

14. The device according to claim 13, further comprising an access unit which translates a logical address into a physical address by referring the address translation table, when access target data corresponding to the translated physical address is stored in the buffer, accesses the access target data stored in the buffer, and when the access target data is not stored in the buffer, accesses the access target data stored in the nonvolatile semiconductor memory.

15. A memory management method comprising:
managing an access history for data stored in a nonvolatile semiconductor memory;
specifying, based on a frequency of access of second data after access of first data indicated in the access history, the second data to be accessed after access to the first data being stored in the nonvolatile semiconductor memory, and registering a second physical address corresponding to the second data in an address translation table in association with a first logical address corresponding to the first data, the address translation table comprising a translation table including the first logical address corresponding with a first physical address of the first data and corresponding with the second physical address of the second data; and
reading out the second data from the nonvolatile semiconductor memory to a buffer.

16. The method according to claim 15, wherein
the registering comprises
registering, in the address translation table in association with the first logical address, at least one of a hit count that is the number of times of an access occurrence for the second data within a first predetermined range after access to the first data and an error count that is the number of times of access nonoccurrence for the second data within a second predetermined range after access to the first data, and updating the second physical address associated with the first logical address based on at least one of the hit count and the error count.

17. The method according to claim 15, wherein
the managing comprises
registering access pattern information of the first data and the second data, and
determining, based on the access pattern information, a timing of reading out the second data to the buffer.

18. The method according to claim 15, wherein
the nonvolatile semiconductor memory comprises a plurality of regions divided into a plurality of channels and a plurality of banks, and
when a plurality of second data exist in correspondence with the first data, the registering comprises assigning a plurality of the second data to the same physical address of regions belonging to different channels or regions belonging to different banks.

19. The method according to claim 18, wherein
the registering comprises assigning the first data and the second data to continuous physical addresses belonging to the same channel and the same bank.

* * * * *